US012603703B2

(12) United States Patent
Rudow et al.

(10) Patent No.: US 12,603,703 B2
(45) Date of Patent: Apr. 14, 2026

(54) NETWORK NODE FOR A NON-DETECTABLE LASER COMMUNICATION SYSTEM

(71) Applicants: HENSOLDT Sensors GmbH, Taufkirchen (DE); Fraunhofer-Gesellschaft zur Förderung der angewandten Forschung e.V., Munich (DE)

(72) Inventors: Oliver Rudow, Oberkochen (DE); Marc Eichhorn, Mannheim (DE); Christelle Kieleck, Munchhausen (FR)

(73) Assignees: HENSOLDT Sensors GmbH, Taufkirchen (DE); Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 169 days.

(21) Appl. No.: 18/229,846

(22) Filed: Aug. 3, 2023

(65) Prior Publication Data

US 2024/0048238 A1     Feb. 8, 2024

(30) Foreign Application Priority Data

Aug. 3, 2022     (EP) ..................................... 22188568

(51) Int. Cl.
*H04B 10/00* (2013.01)
*H04B 10/112* (2013.01)
*H04B 10/50* (2013.01)

(52) U.S. Cl.
CPC ....... *H04B 10/1123* (2013.01); *H04B 10/503* (2013.01)

(58) Field of Classification Search
CPC .. H04B 10/11; H04B 10/1123; H04B 10/125; H04B 10/1127; H04B 10/1129; H04B 10/114; H04B 10/1143; H04B 10/1149; H04B 10/118; H04B 10/116; H04B 10/40; H04B 10/503; H04B 10/501; H04B 10/505; H04B 10/0795; H04B 10/1125; H04B 10/112

(Continued)

(56) References Cited

U.S. PATENT DOCUMENTS 6,154,299 A * 11/2000 Gilbreath ........... H04B 10/2587
398/1
7,054,563 B2 * 5/2006 Tsumura ................ H04B 10/40
398/91

(Continued)

FOREIGN PATENT DOCUMENTS

WO         0145981 A2     6/2001

OTHER PUBLICATIONS

European Patent Office, Extended European Search Report, Application No. 22188568.4, dated Jan. 31, 2023, 9 pages.

*Primary Examiner* — Hanh Phan
(74) *Attorney, Agent, or Firm* — Mahamedi IP Law LLP

(57) ABSTRACT

Examples include a network node for a non-detectable laser communication system, a bi-directional laser communication system comprising such a network node, a method for a non-detectable laser communication, and in particular to an optronic system for non-detectable, compact bi-directional laser communication, which is particularly suitable for communication with a drone or other unmanned vehicle (UXV).

12 Claims, 2 Drawing Sheets

(58) Field of Classification Search
USPC ....... 398/169, 170, 118, 119, 120, 121, 122,
398/123, 124, 125, 126, 127, 128, 129,
398/130, 131, 135, 136, 33, 38, 182, 183,
398/188, 158, 159, 25, 26, 27
See application file for complete search history.

(56) References Cited

U.S. PATENT DOCUMENTS

| | | | |
|---|---|---|---|
| 7,113,707 B2 * | 9/2006 | Pepper | ............... H04B 10/1125 |
| | | | 398/118 |
| 10,649,117 B1 | 5/2020 | Lewellen et al. | |
| 2007/0223929 A1 | 9/2007 | Graves | |
| 2015/0160384 A1 | 6/2015 | Arbabi et al. | |
| 2015/0355328 A1 | 12/2015 | Maryfield et al. | |
| 2019/0018227 A1 * | 1/2019 | Maryfield | .......... H04B 10/2587 |
| 2020/0303576 A1 | 9/2020 | Hoheisel | |

* cited by examiner

100

110     115                    10                    123          120

20

NETWORK NODE FOR A NON-DETECTABLE LASER COMMUNICATION SYSTEM

TECHNICAL FIELD

The present invention relates to a network node for a non-detectable laser communication system.

BACKGROUND

There are communication systems known in the state of the art which rely on focused electromagnetic radiation as a carrier of information. In particular, communication via laser beams allows high throughput point-to-point communication, sometimes over vast distances, through air, water, or space, and with little data loss. Such systems convey information by means of adaptations of the laser beams, e.g., with respect to amplitude, phase, frequency, or pulse rate. "Point-to-point" refers to a communication connection between typically two communication endpoints, or nodes.

In military battlefield applications, directed laser communication between individual military combatants of own or friendly troops, such as individual soldiers, base stations, ground-, air- and/or naval platforms, is applied in cases where a highly secure exchange of high data rates between two or more communication subscribers (or nodes) is required. Such systems usually operate within the near infrared or short-wave infrared electro-magnetic spectrum. Laser technologies and detectors are available that ensure a stable communication, offering sufficient data bandwidth to transfer even high-resolution video streams in real-time through the atmosphere, over distances of e.g., several kilometers.

There are laser communication systems in the state of the art which are designed to ensure a bi-directional communication, with laser transmitters and laser signal receivers on each side of the point-to-point connection. Since the communication participants or nodes of such a system are often not located stationarily, but integrated into dynamic platforms, both transmitters and receivers need to be actively directed towards the communication counterpart, on both sides of the point-to-point connection, in order to keep the laser communication intact. Transmitters and receivers are usually integrated into a pointer tracker that stabilizes the pointing direction of the transmitter and receiver onto the communication counterpart throughout the entire communication period.

Designs of such laser communication systems depend on requirements with respect to spatial extent, weight, and power consumption. In a military context, hiding the communication from a third party is a further common desire. These requirements become more challenging the more agile the own platform, and the longer the communication distance. Therefore there exists a demand for more efficient, light-weight and compact laser communication systems, whose operation is also more challenging to be detected by third parties.

SUMMARY OF THE INVENTION

A contribution to satisfy the above-mentioned demand is provided by a network node for a non-detectable laser communication system, a bi-directional laser communication system, and a method for bi-directional laser communinication. The dependent claims refer to further advantageous realizations for the subject matters of the independent claims.

The present invention relates to a network node representing a communication point of a non-detectable laser communication system, wherein the laser communication system is configured to send to the network node at least one laser beam which is employed as a carrier of communication data. The network node comprises a reflector device, configured to generate, by a reflection of the laser beam, a reflected laser beam, and a modulator device, configured to provide a modulation of the reflected laser beam. By means of the modulation, the reflected laser beam can be adapted to carry communication data which is independent from the communication data conveyed by the incoming laser beam.

In advantageous embodiments, the network node does thus itself not comprise a laser source. The reflected laser beam is, in particular, generated by relaying (reflecting, deflecting) the laser beam, i.e. the reflected laser beam is not generated through another process of optical amplification based on stimulated emission of electromagnetic radiation within the reflector device. Hence, the network node can be carried by a small device. Since the communication relies on reflection, a detection of the communication becomes very difficult. Furthermore, since the carrying device can be made very small, also the detection of the carrying device is complicated. As a result, embodiments are particularly suitable for drones or other flying objects or ground vehicles that shall not be detected, and whose communication with a base station (with a base node) shall not be intercepted.

The modulation may be carried out on the laser beam, i.e. before a reflection takes place, and/or on the reflected laser beam, i.e. after a reflection has taken place. The modulation may in particular be implemented by filters and/or by opto-electronic modulators or lens systems. The modulation may comprise amplitude and/or phase and/or polarization and/or frequency modulation. The modulation may also be carried out by adapting the reflection device in such a way that the process of reflection itself is suitably altered. In some embodiments, the reflector device may e.g., comprise phase-conjugate mirrors adapted to provide the modulation.

The reflector device and the modulator device may be realized separately, or integrated into each other.

The network node may further comprise a receiver. In embodiments, this receiver is configured to receive information conveyed by means of the laser beam. This receiver may in particular be integrated into the reflector device, and/or into the modulator device. Receivers may be implemented as opto-electronic contrivances according to the state of the art.

The communication system may comprise several such network nodes.

Optionally, the reflector device comprises an orientable reflector, and there is a mechanism in the reflector device which is configured to orient the reflector, wherein a determination of a target orientation of the reflector is based on the laser beam. The mechanism may be a mechanical or opto-electronic guiding appliance. The guiding appliance may be configured to receive a signal via the laser beam for aligning the reflector (or reflector device).

Optionally, the reflector device is configured to determine an own position, and to orient the reflector based on the own position. The own position may e.g., be a position of the network node in a map which also comprises a position of a source, and thus an approximate angle of incidence, of the laser beam. The map may be stored in the network node, or at a location of the source of the laser beam. The reflector device may be configured to determine its position e.g., as coordinates from a navigation system. The navigation system may be a global navigation satellite system (such as the Global Positioning System, or Galileo). The reflector device may also employ any other method to determine the own position of the network node, which may e.g., be based on an itinerary or trajectory of a system hosting the network node.

In embodiments, orienting the reflector may comprise an initial connection of the laser beam with the reflector device, which may e.g., be achieved based on map data and may not yet yield an optimal orientation of the reflector for generating the reflected laser beam. Due to the non-optimal orientation of the reflector, the reflected laser beam may initially have only a fraction of an intensity obtained at an optimal orientation. This fraction may be measured, which may happen e.g., by means of a device located at the network node, or by means of a device located at a source of the laser beam (in particular, a basic node of the communication system). The respective device may be configured to determine, based on the fraction of the intensity, data for achieving an optimal or better orientation of the reflector. In case this determination takes place at the source of the laser beam, the data may then be conveyed back to the network node by means of the laser beam. Based on the data, the guiding appliance may orient the reflector in order to achieve an optimal, or at least improved, communication (e.g., a better reflection).

Optionally, the reflector device comprises an omni-directional retroreflector, and/or a retroreflector configured to retroreflect the laser beam only if the laser beam arrives within a restricted set of angles of incidence.

A retroreflector may be understood as a device or surface that reflects incident radiation or light generally back to its source, with minimal scattering (retroreflection). In embodiments, the retroreflector may be configured such that the direction of the reflected laser beam is modified, in particular with respect to an angle of reflection and/or with respect to an offset between the laser beam and the reflected laser beam. The retroreflector may be configured to reduce a power loss of the reflected laser beam relative to the laser beam, and it may be configured to further focus the reflected laser beam. The retroreflector may achieve the reflection by means of a metallic surface or a dielectric surface. Some embodiments implement the retroreflector as a multi-layered structure.

A retroreflector may provide this directed reflection for a wide range of angle of incidence of the laser beam. In general, an omni-directional reflector is characterized by a high reflectivity of electromagnetic waves for a wide range of, or ideally any, angle of incidence. The omni-directional retroreflector may be configured for a particular wavelength, or for a particular range of wavelengths, depending on the laser beam.

However, in advantageous embodiments the retroreflector is configured to retroreflect the laser beam only if the latter arrives under a restricted set of angles of incidence. The term "restricted set" may be understood as comprising only a comparatively small subset of all possible angles of incidence, such as, e.g., a range of two degrees around a main orientation of the retroreflector. Such a restricted set may provide the advantage that retroreflection may not be triggered from arbitrary angles, and the network node (or the communication system) may thus be harder to detect by third parties. As an additional advantage, for such retroreflectors a larger variety of materials and mechanisms may be employed, including e.g., simple versions of distributed Bragg reflection. As described before, embodiments may comprise a guiding appliance configured to direct the reflector, and to align it to the laser beam for optimizing communication efficiency.

Optionally, the reflector device comprises at least one reflector which is configured to retroreflect incident light only if the incident light has a wavelength (e.g., a main carrier wavelength of the laser beam) satisfying particular bounds. These bounds may in particular comprise that the wavelength is above 900 nm, providing the advantage that the laser beam may be picked to be undetectable by common night vision devices. In order to further reduce potential eye damage, the wavelength may be above 1.4 µm, or within a range of wavelengths comprising 1.5 µm. The wavelength may further be picked in a range of wavelengths comprising 2 µm, 2.1 µm, or 2.2 µm. This may be advantageous as there are laser jamming devices, range finders, and/or target designation contrivances which operate with laser beams at these frequencies, thus creating an opportunity to further hide the communication from third parties, e.g., by disguising the communication system, or an opportunity to employ laser beams of such existing systems for communication. The wavelength may furthermore be picked from mid-wave infrared range (typically encompassing 3 µm to 5 µm), e.g., for further reduction of potential eye damage or to reduce the detectability.

Optionally the reflector device comprises a corner cube, a cat eye, a retroreflecting foil, and/or a surface based on micro-spheres and/or micro-pyramids. In embodiments, the reflector device may thus comprise a rather simple retroreflector.

Optionally, the modulation comprises a modulation of an amplitude, a modulation of a phase, a modulation of a spectrum, a modulation of a pulse rate, and/or a modulation of a polarization of the laser beam and/or the reflected laser beam. In order to provide the modulation by polarization of the laser light, the reflector—such as a cube reflector—may be configured to exhibit particularly polarized eigenmodes, such as left- or right-handed elliptic polarizations. The modulation device may be configured to switch between the eigenmodes by means of a mechanical or opto-electronic contrivance. The polarized eigenmodes may furthermore be employed as a means of verification of the network node. For this, a reflection of the laser beam may be checked, at the location of the source of the laser beam, to exhibit a particular polarization pattern induced by the network node, which may be interpreted as a sign that the laser beam in fact reached the network node (and not some other, unintended reflecting target). It can thus be used as an identification.

Optionally, the modulation device provides the modulation based on an acousto-optic modulation method, an electro-optic modulation method, and/or an interferometric modulation method. To this end, the modulator device may comprise a liquid crystal, and/or a microelectromechanical system. The liquid crystal may provide, in particular, the modulation of the phase mentioned before. The microelectromechanical (or electro-optical) system may also operate based on a mechanism for changing a refractive index.

Optionally, the network node is configured for being installed on an unmanned aerial vehicle (e.g., a drone), ground, or nautical vehicle, on a portable device, on a helmet, or on a wearable system, in particular a vision support system. Embodiments comprise an installation of the network node on a miniaturized drone serving as communication point in a battlefield situation.

Embodiments further relate to a bi-directional laser communication system, comprising one or more network nodes as described above, and at least one basic node with a laser device configured to generate a laser beam and to send the laser beam to at least one of the network nodes.

In order to admit communication, the laser beam is adapted to carry data, or information. Methods of how to adapt a laser beam to carry data for communication may in particular include those mentioned for the modulation device mentioned above, and in particular comprise an adaptation of an amplitude, a phase, a frequency, a pulse rate, and/or a polarization of the laser beam.

In embodiments, the at least one basic node is included as a first communication point of the bi-directional laser communication system, configured as a point-to-point communication system, while the one or more network nodes, each comprising the reflector device and the modulator device as mentioned above, represent further communication points. These communication points may be localized on different platforms or vehicles. As mentioned before, the network nodes may keep a much simpler design, and in particular may not require a laser source installed on their respective hosts.

The bi-directional communication system advantageously comprises, at the basic node, a receiver, configured to receive the reflected laser beam and to interpret the modulation of the reflected laser beam. In embodiments, this receiver is integrated with the laser device.

In embodiments, the basic node initiates a contact between the communication points of the bi-directional communication network. Messages or information are transmitted from any communication point by modulating the laser beam or the respective reflected laser beam.

The wavelength (or a dominant part of the laser beam spectrum) may be chosen to optimize overall system link parameters, such as minimizing noise or maximizing range under different atmospheric conditions.

The bi-directional communication system may be part of a larger system for electronic warfare, such as a Common Infrared Countermeasures (CIRCM) or Directed Infrared Countermeasures (DIRCM) system, an optical detection system, or an electro-optical tracking system (EOTS).

The laser beam may have a spectrum of wavelengths located predominantly within the near or mid or far infrared, short-wave infrared, visible, or ultraviolet part of the electromagnetic spectrum.

Optionally, the laser beam has a wavelength satisfying one or more of the bounds listed above. In particular, the wavelength may have a value above 900 nm, or above 1.4 μm, or within a range of wavelengths comprising 1.5 μm. The wavelength may further be picked in a range of wavelengths comprising 2 μm, 2.1 μm, 2.2 μm, or 2.1 μm. The wavelength may furthermore be picked from mid-wave infrared range (typically encompassing 3 μm to 5 μm).

In embodiments, the laser device in particular, and more generally the basic node, may be part of a range finder, a jamming device, and/or a laser designator device, or of some other system of electronic warfare.

Optionally, the at least one basic node and/or any of the one or more network nodes comprise, or are comprised in, a pointer tracker system. In an advantageous embodiment, in particular the at least one basic node comprises such a pointer tracker.

Optionally the communication system comprises a further node, which may be a basic node or a network node of the kind described above, wherein at least one network node is configured to direct the reflected laser beam at the further node. The network node may thus serve as a relay station in the communication system, i.e., the reflected laser beam may be emitted under a different angle than the angle of incidence of the laser beam. The bi-directional communication system may thus represent a network of communication powered by a single or merely a few originally generated laser beams.

Optionally, the reflector device in the system comprises an orientable reflector and is configured to orient the reflector based on the laser beam. For example, the reflection surface of the reflector can be oriented perpendicular to the laser beam so that only signals from this laser beams are retroreflected. The basic node in the system may comprise a laser device configured to generate the laser beam and to send the laser beam to the network node. The basic node may further comprise a device configured to determine, based on an intensity of the reflected laser beam, data for achieving a better orientation of the reflector, and to convey the data to the network node by means of the laser beam. This provides the advantage that the non-detectability of the system is further improved because the system is able to adjust the orientation of the reflector dynamically exactly on the laser beam and only on the laser beam. Thus, a scanning laser trying to detect the system based retroreflection will never be able to detect the system because even if the orientation of the system has changed (e.g., if it has been moved) the reflector device is able to readjust the orientation quickly by evaluating or monitoring the intensity of the received reflected laser beam. The setup further provides the advantage that by determining the better orientation of the reflector in the basic node, a control of a precise orientation of the reflector may remain exclusively with the basic node. The network node does not have to be equipped with a means for determining the better orientation, which may allow a simpler structure of the network node.

Embodiments further relate to a method for bi-directional laser communication, comprising generating a laser beam, and generating, from the laser beam, a modulated reflected laser beam.

Optionally this method is performed in a system for bi-directional laser communication as described above, and further comprises directing, based on a position of the reflector device, the laser beam at the reflector device, and determining, based on the laser beam, an orientation of the reflector device for optimizing the communication.

As described above, the position of the reflector device (or, depending on the embodiment, a position of the corresponding network node) is understood with respect to the laser device (or with respect to the corresponding basic node). The position may be a position on a map, obtained via a GNSS or some other method of position determination, e.g., based on an intinerary or trajectory of the host vehicle (s) of basic node and/or network node.

Directing the laser beam may be performed in order to establish merely an initial contact between the basic node and the network node. Determining the orientation of the reflector device is then performed in order to ameliorate or optimize the communication. Determining the orientation of the reflector device may comprise measuring an intensity of a reflection of the laser beam after the initial contact, which may be performed either at the network node or at the base node. Based on the measured intensity, parameters for a better orientation may be calculated. In case this happens at the base node, the parameters may be conveyed to the network node via the laser beam.

In embodiments, the communication network is configured to perform the methods presented here in a partially or fully automatic way. Embodiments therefore further relate to a computer-readable storage medium, comprising instructions which, when executed by a computer, cause the computer to carry out these methods.

Embodiments of the bi-directional communication system, and the associated method, in particular include a system with one or more light-weight nodes (or communication points) with very low energy consumption, along with a single or very few nodes comprising a laser source. The reflector device and the modulator device may be installed on a very small platform with low thermal signature and radar cross section. The bi-directional communication system allows a laser communication with very low scatter when any of the associated nodes travel through the atmosphere. The system, and in particular the light-weight nodes comprising the reflector devices and modulator devices, can be made difficult to be separated from the solar background, and their detectability by means of standard laser warner receivers can be reduced. Detectability may be further reduced by choosing an intelligent and inconspicuous signal modulation method.

BRIEF DESCRIPTION OF THE FIGURES

Various embodiments of the present invention will be described in the following by way of examples only, and with respect to the accompanying drawings, in which.

DETAILED DESCRIPTION

Various examples will now be described more fully with reference to the accompanying drawings in which some examples are illustrated.

Accordingly, while examples are capable of various modifications and alternative forms, the illustrative examples in the figures and will herein be described in detail. It should be understood, however, that there is no intent to limit examples to the particular forms disclosed, but on the contrary, examples are to cover all modifications, equivalents, and alternatives falling within the scope of the disclosure as defined by the claims, interpreted in light of the description. Like numbers refer to like or similar elements throughout the description of the figures.

The terminology used herein is for the purpose of describing illustrative examples only and is not intended to be limiting. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements and/or components, but do not preclude the presence or addition of one or more other features, steps, operations, elements, components and/or groups thereof.

Unless otherwise defined, all terms (including technical and scientific terms) used herein have the same meaning as commonly understood by one of ordinary skill in the art to which examples belong. It will be further understood that terms, e.g., those defined in commonly used dictionaries, should be interpreted as having a meaning that is consistent with their meaning in the context of the relevant art, and will not be interpreted in an idealized or overly formal sense unless expressly so defined herein.

Figure 1:
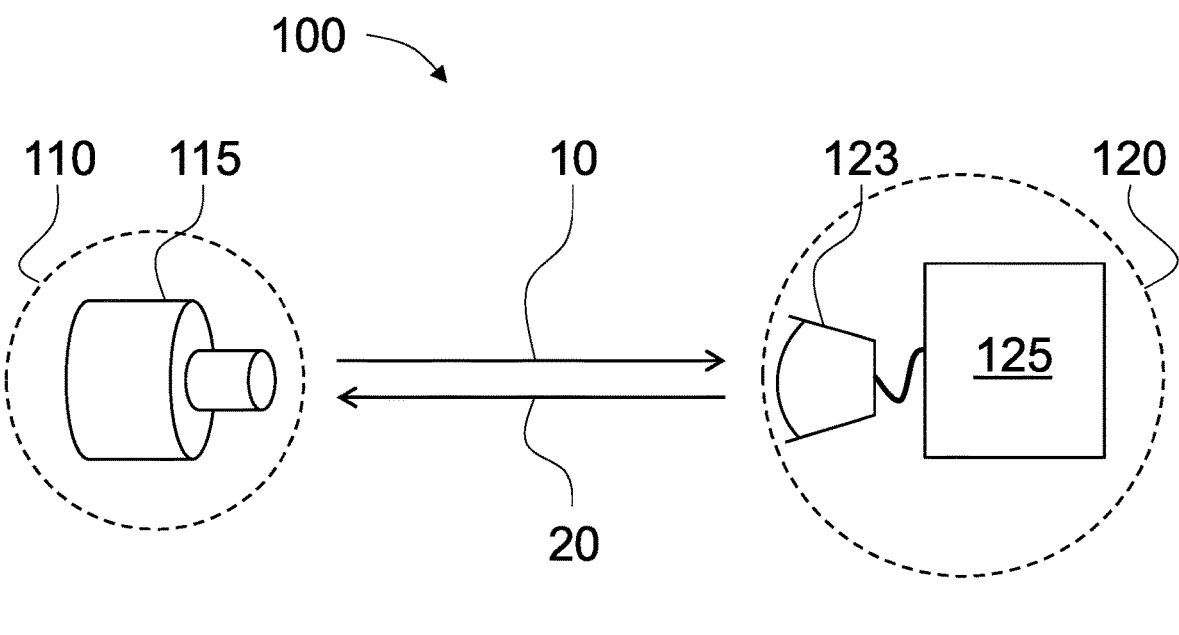
FIG. 1 depicts an embodiment of a bi-directional laser communication system with a network node according to the present invention.

FIG. 1 depicts a bi-directional laser communication system 100 configured to send a laser beam 10 to a network node 120 of the bi-directional laser communication system 100. The network node 120 comprises a reflector device 123, configured to generate, by a reflection of the laser beam 10, a reflected laser beam 20. The network node 120 further comprises a modulator device 125, configured to provide a modulation of the reflected laser beam 20.

The laser communication system 100 further comprises a basic node 110 with a laser device 115. The laser device 115 includes a laser source, and is configured to generate the laser beam 10.

In embodiments, the basic node 110 with the laser device 115 represents one side of a communication channel established by the laser beam 10 and the reflected laser beam 20. Located on another side of this channel is the network node 120, which has a much simpler design, in particular without the need for an associated laser source.

The basic node 110 may initiate the laser beam 10 and thus establish a basis for the communication. The basic node 110 and the network node 120 may communicate by modulating the laser beam 10 and the (retro-)reflected laser beam 20, respectively.

The modulation may be performed as an amplitude, phase, spectral, pulse, and/or polarization modulation. The modulation may be performed by an acousto-optic, electro-optic, liquid-crystal, or microelectromechanical system, MEMS, type of modulator device that either transmits or reflects the incident light onto the reflector device 123. The reflector device 123 may e.g., comprise a corner cube, a retro-reflecting foil or surface based on micro-spheres or micro-pyramids, or any other optical arrangement which retroreflects incoming radiation back onto itself, further under a specific angle, or backward with a parallel offset in respect to the incoming laser beam 10.

A wavelength of the laser beam 10 may be chosen to optimize overall system link parameters, such as minimizing a noise or maximizing a range under different atmospheric conditions. Especially for battlefield situations, the laser beam 10 may comprise a component electromagnetic wave with a wavelength above 900 nm, above 1.4 μm, within a range of wavelengths comprising at least one of 1.5 μm, 2 μm, 2.1 μm, or 2.2 μm, or within a mid-wave infrared range (3 μm to 5 μm).

In a preferred embodiment, the network node 120 may be included in a drone carrying a fixed camera or other staring or directional sensor which needs to be pointed at a specific area or direction. In this case, omni-directional retroreflecting optics may be used as the reflector device 123, and they may be combined with the modulator device 125. The omni-directional retroreflecting optics may e.g., include an over-hemispherical collection optics directing the incoming laser beam 10 onto a retroreflecting surface, in front of which a modulator is placed.

In a further embodiment, the camera or the sensor is directable together with the reflector device 123, and therefore the platform, e.g., a drone, can optimize an angular position of the reflector device 123 to maximize retroreflection, utilizing, for example, a simple corner-cube retroreflector. The optimization may be achieved by assuming a position that maximizes an apparent reflector aperture as seen from a direction of the incoming laser beam 10. A control signal for this optimization may be obtained from the basic node 110 by e.g., sending information about a received retroreflected signal strength (of the reflected laser beam 20) back to the platform of the network node 120, allowing for optimizing orientation, or alignment, of the reflector device 123. In such an embodiment, a laser cross-section of a retroreflector in the reflector device 123 may be strongly reduced in other directions, such that adverse interrogation of the retroreflector by a laser in order to capture the information carried by the modulated laser beams 10, 20 can be prevented. Thus, the communication becomes non-detectable.

The basic node 110 may be on a base station controlling the exemplary drone. In contrast to the exemplary drone, the basic node 110 could be detectable because of the active laser device 115. Advantageously, the network node 120 remains, together with carrying device, concealed from any hostile party.

The bi-directional laser communication system 100 may thus be deployed in modern battlefield scenarios. In such cases, the reflector device 123 and the modulator device 125 may be integrated into a small and light-weight platform that may be acting, e.g., as an agile relay station to ensue communication between own troops, or as a detached reconnaissance system for observing hostile troops. A bandwidth of the modulation of both the laser beam 10 and the modulated laser beam 20 is chosen such that pictures, images or videos may be transmitted in the communication system 100.

Figure 2:
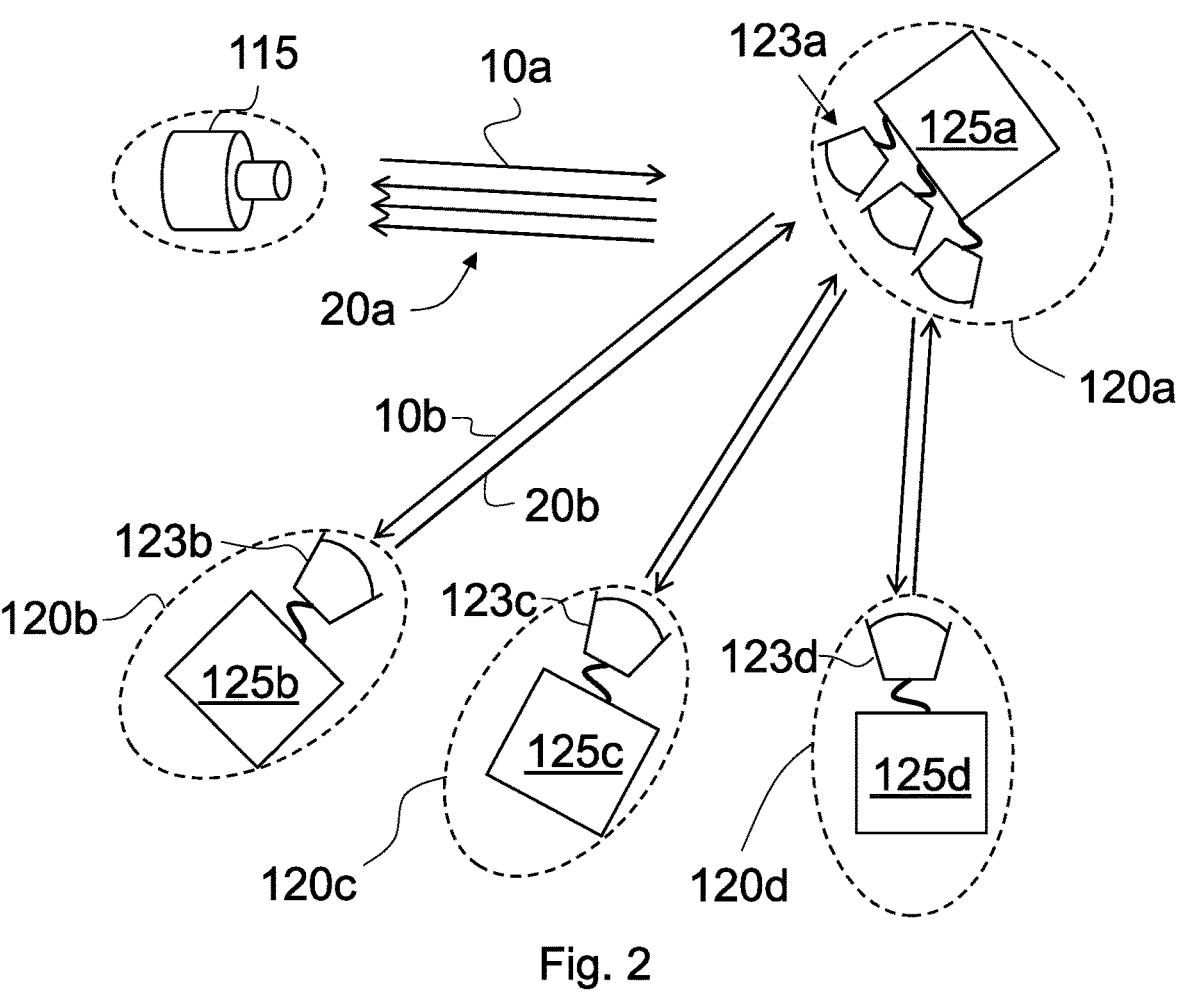
FIG. 2 depicts a further embodiment of a bi-directional laser communication system.

FIG. 2 depicts another embodiment of the bi-directional laser communication system 100. The system 100 comprises several platforms with network node 120a, 120b, 120c, 120d, thus forming a network of (bi-directional) communication laser beams 10a, 10b, . . . , 20a, 20b, . . . , powered by a laser device 115 from only one basic node 110. The platforms on which the basic node 110 and/or the network node 120a, 120b, 120c, 120d are installed may e.g., be unmanned air (UAV), ground (UGV) or naval (UNV) vehicles (collectively also referred to as UXV), acting as terminals for the laser communication. The bi-directional laser communication system 100 may contribute towards making these platforms hardly reconnaissable by hostile troops, and towards making the communication or data exchange not readable to third parties. The bi-directional communication system 100 can provide a directable and stable laser communication with high data bandwidth, operating over long distances (e.g., several tens of kilometers), and staying operational for a long time (such as several hours, or days).

Figure 3:
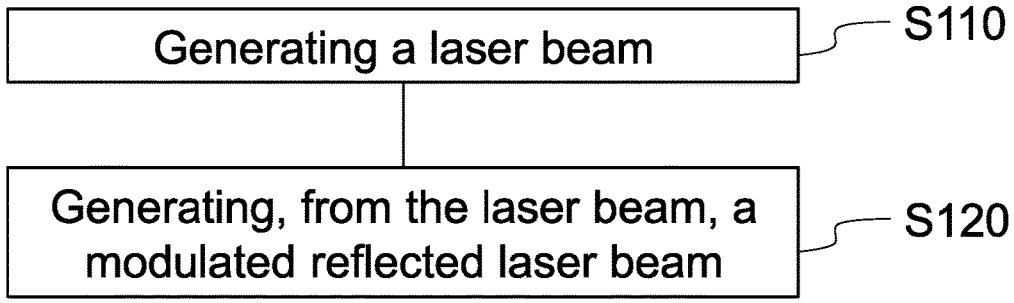
FIG. 3 illustrates a method for bi-directional laser communication.

FIG. 3 depicts steps of a method for bi-directional laser communication. The method comprises generating S110 a laser beam 10; and generating S120, from the laser beam 10, a modulated reflected laser beam 20, such that the laser beam 10 and the reflected laser beam 20 can be used to transmit individual, unrelated pieces of information.

The method may further comprise measuring the power of the reflected laser beam 20 received at the location of the laser device (basic node 110), determining, based on a power received via the reflected laser beam 20, a correction for an alignment of the reflector device 123, and if necessary conveying the correction to the reflector device 123, in order to orient the reflector device 123 to improve communication efficiency.

In embodiments, the method is employed to establish a laser communication by first providing an initial contact between the basic node 110 and the network node 120, and then orienting a reflector of the reflector device 123 in the network node 120 for improved communication. The reflector may act as a retro-reflector for a particular, narrow range of angles of incidence. The reflector, or the reflector device 123, may be configured to generate the initial reflection and/or the reflected laser beam 20 with a specific polarization, depending on the laser beam 10. This may be employed to verify that the reflected laser beam 20 is indeed generated by the network node 120 (rather than by some unintended other device).

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

10 laser beam
20 reflected laser beam
100 bi-directional laser communication system
110 basic node
115 laser device
120 network node
123 reflector device
125 modulator device
S110, S120 steps of a method

What is claimed is:

1. A bi-directional laser communication system comprising:
   a network node; and
   a basic node;
   wherein the network node comprises:
      a reflector device, configured to generate, by a reflection of a laser beam, a reflected laser beam; and
      a modulator device, configured to provide a modulation of the reflected laser beam;
      wherein the reflector devices comprises an orientable reflector and is configured to orient the reflector based on the laser beam;
   wherein the basic node comprises:
      a laser device configured to generate a laser beam and to send the laser beam to the network node, and a device configured to determine, based on an intensity of the reflected laser beam, data for achieving a better orientation of the reflector, and to convey the data to the network node using the laser beam.

2. The system according to claim 1, wherein the reflector device is configured to determine an own position, and to orient the reflector based on the own position.

3. The system according to claim 1, wherein the reflector device comprises one or more of the following: (i) an omni-directional retroreflector, or (ii) a retroreflector configured to reflect the laser beam only if the laser beam arrives within a restricted set of angles of incidence.

4. The system according to claim 1, wherein the reflector device comprises at least one reflector which is configured to retroreflect incident light only if the incident light has a wavelength satisfying at least one of the following bounds: (i) at least 900 nm, (ii) at least 1.4 μm, (iii) within a range of wavelengths comprising at least one of 1.5 μm, 2 μm, 2.1 μm, or 2.2 μm, or (iv) within mid-wave infrared range.

5. The system according to claim 1, wherein the reflector device comprises one or more of the following: (i) a corner cube, (ii) a cat's eye retroreflector, (iii) a retroreflecting foil, or (iv) a surface based on micro-spheres and/or micro-pyramids.

6. The system according to claim 1, wherein the modulation comprises one or more of the following: (i) a modulation of an amplitude, (ii) a modulation of a phase, (iii) a modulation of a spectrum, or (iv) a modulation of a polarization.

7. The system according to claim 1, wherein the modulation device provides the modulation based on one or more of the following: (i) an acousto-optic modulation method, (ii) an electro-optic modulation method, (iii) an interferometric modulation method, (iv) a liquid crystal, or (v) a microelectromechanical system.

8. The network node according to claim 1, wherein the network node is configured for being installed on one or more of the following: (i) an unmanned aerial, ground, or nautical vehicle, (ii) a portable device, (iii) a helmet, or (iv) a wearable vision support system.

9. The system according to claim 1, wherein the laser device is part of one of the following devices: a range finder, a jamming device, or a laser designator device.

10. The system according to claim 1, wherein the basic node and/or the network node comprise a pointer tracker system.

11. The system according to claim 1, further comprising:

a further node, wherein the network node is configured to direct the reflected laser beam at the further node.

12. A method for non-detectable laser communication, comprising:

generating a laser beam;

generating, from the laser beam, a modulated reflected laser beam using an orientable reflector;

determining, based on an intensity of the reflected laser beam data for achieving a better orientation of the reflector;

conveying the data back by means of the laser beam; and orienting the reflector based on the conveyed data.

* * * * *